March 13, 1962 F. A. GASTRIGHT 3,024,710
POPCORN PACKAGING AND DELIVERING
Filed July 16, 1956 9 Sheets-Sheet 1

INVENTOR
FRANK A. GASTRIGHT

BY James H. Littlepage

ATTORNEY

March 13, 1962  F. A. GASTRIGHT  3,024,710
POPCORN PACKAGING AND DELIVERING
Filed July 16, 1956  9 Sheets-Sheet 2
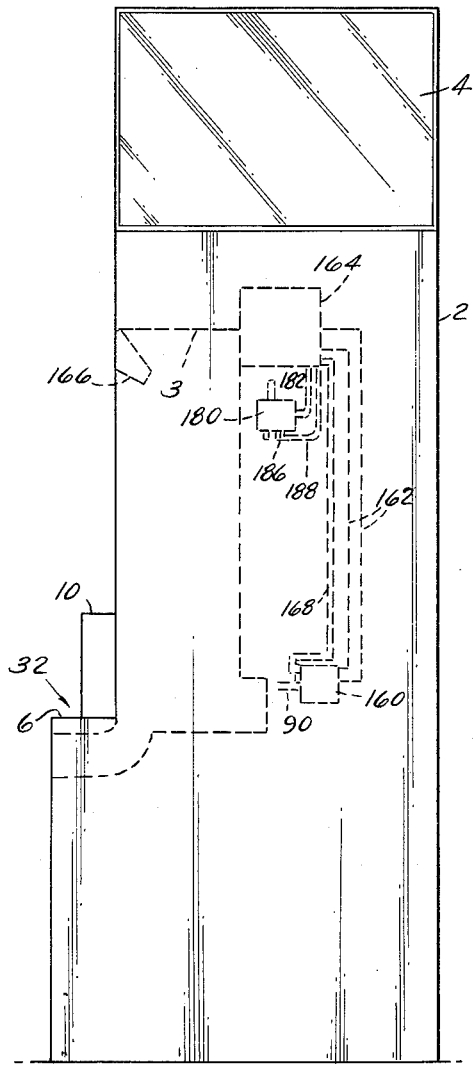
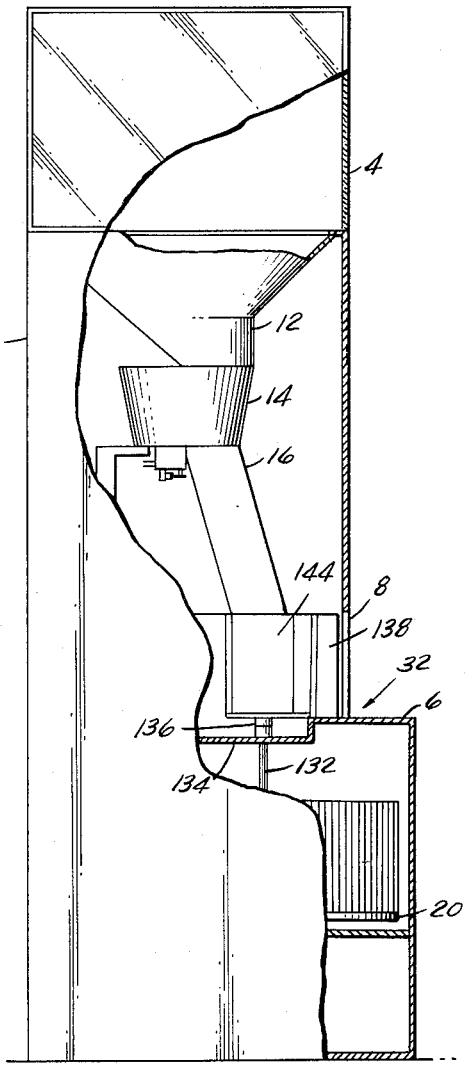
INVENTOR
FRANK A. GASTRIGHT
BY
ATTORNEY March 13, 1962 F. A. GASTRIGHT 3,024,710
POPCORN PACKAGING AND DELIVERING
Filed July 16, 1956 9 Sheets-Sheet 3

INVENTOR
FRANK A. GASTRIGHT

BY
ATTORNEY

March 13, 1962  F. A. GASTRIGHT  3,024,710
POPCORN PACKAGING AND DELIVERING
Filed July 16, 1956  9 Sheets-Sheet 4
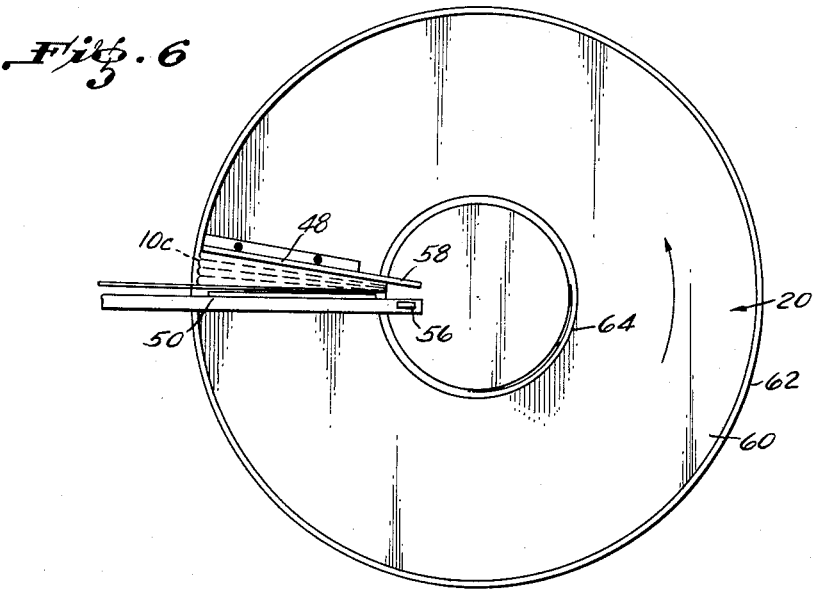
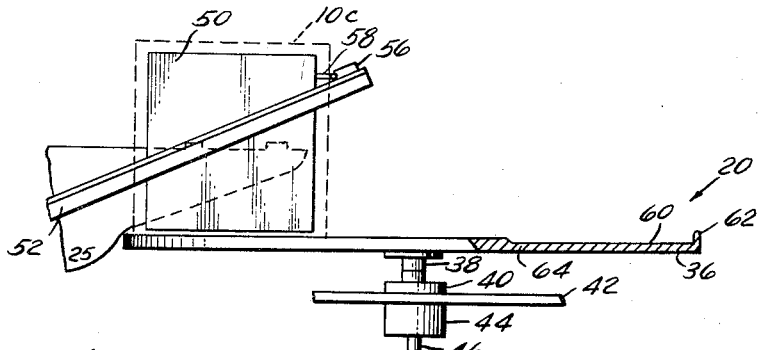
INVENTOR
FRANK A. GASTRIGHT
BY
ATTORNEY March 13, 1962 F. A. GASTRIGHT 3,024,710
POPCORN PACKAGING AND DELIVERING
Filed July 16, 1956 9 Sheets-Sheet 5
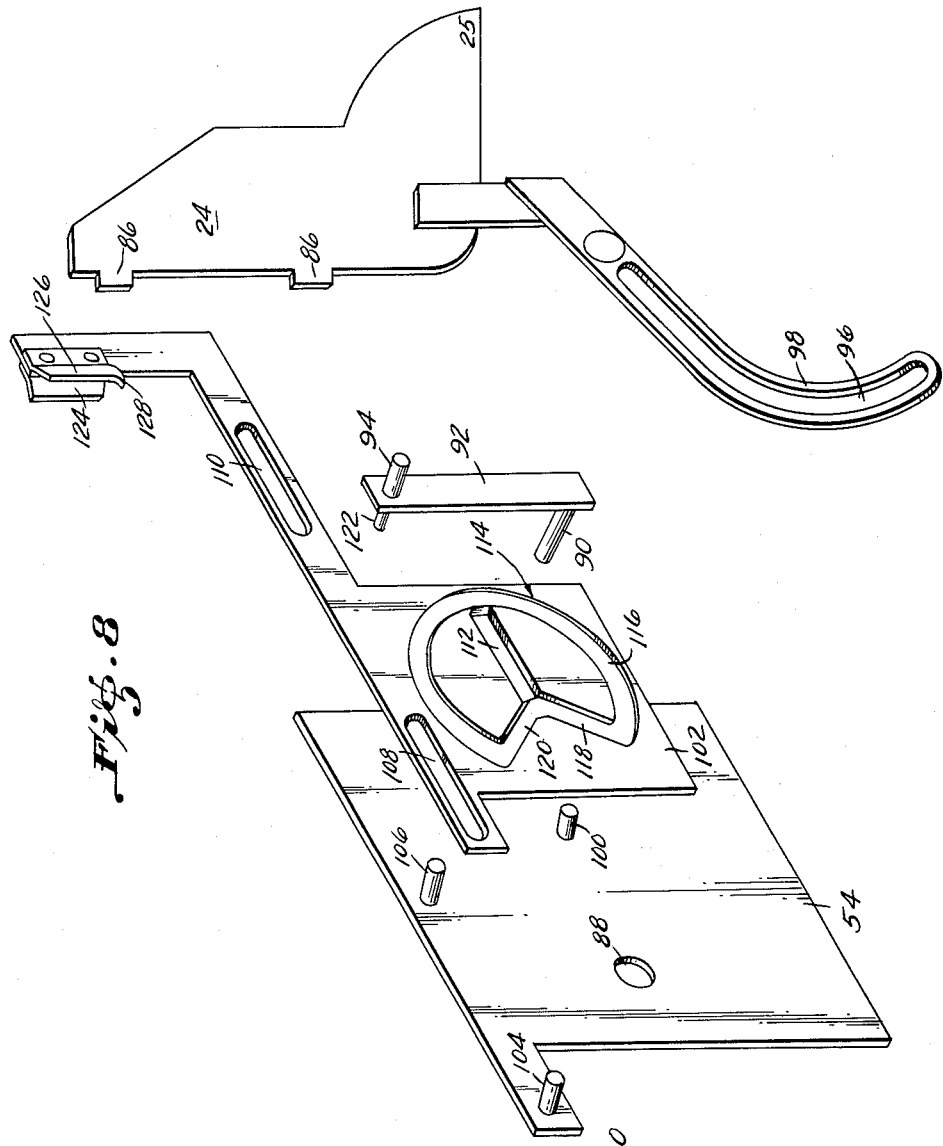
INVENTOR
FRANK A. GASTRIGHT
BY
James H. Littlepage
ATTORNEY

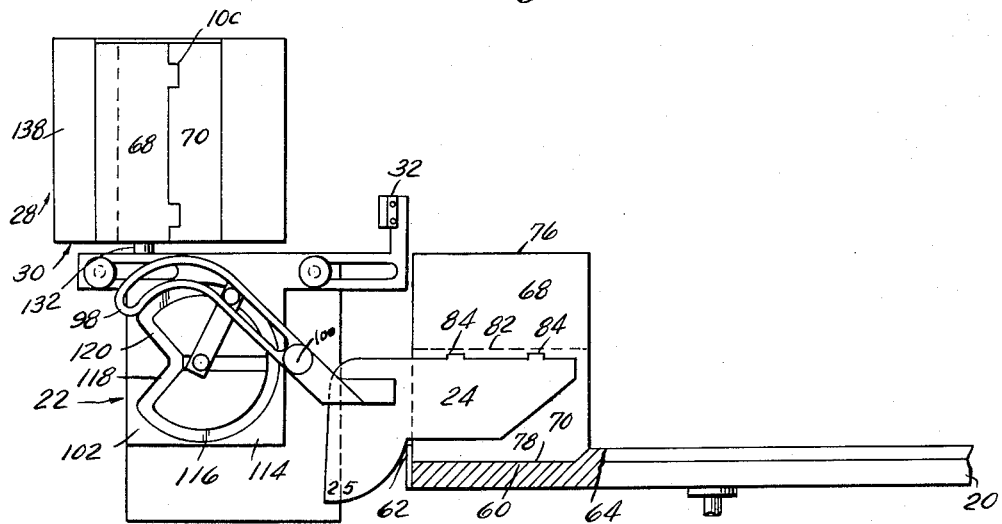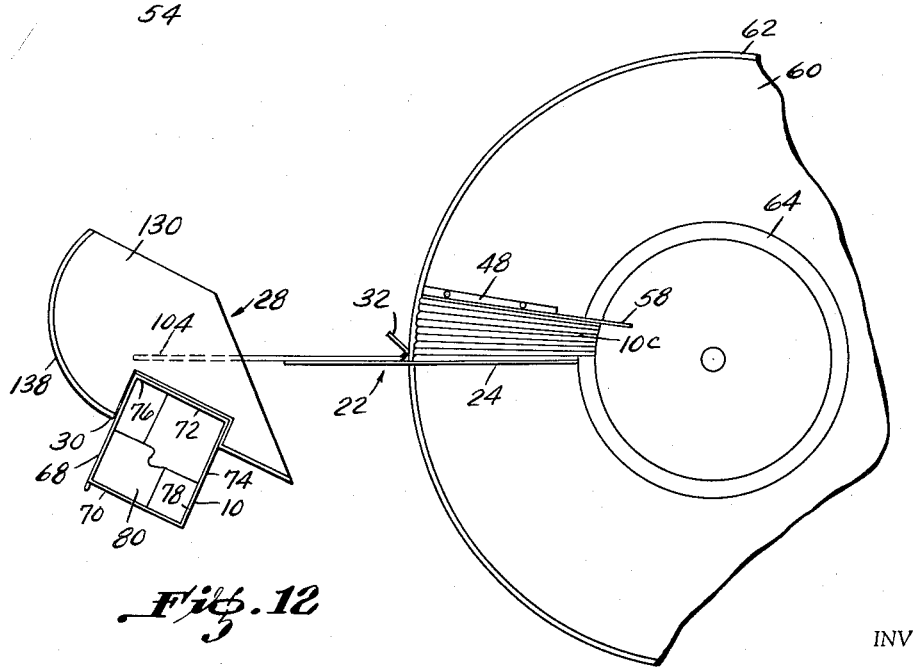

March 13, 1962 F. A. GASTRIGHT 3,024,710
POPCORN PACKAGING AND DELIVERING
Filed July 16, 1956 9 Sheets-Sheet 7
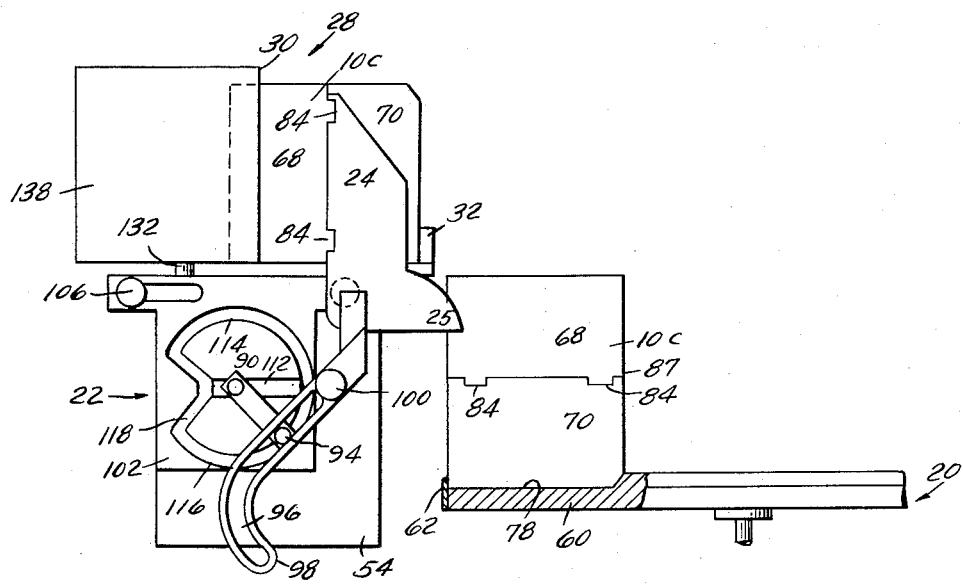
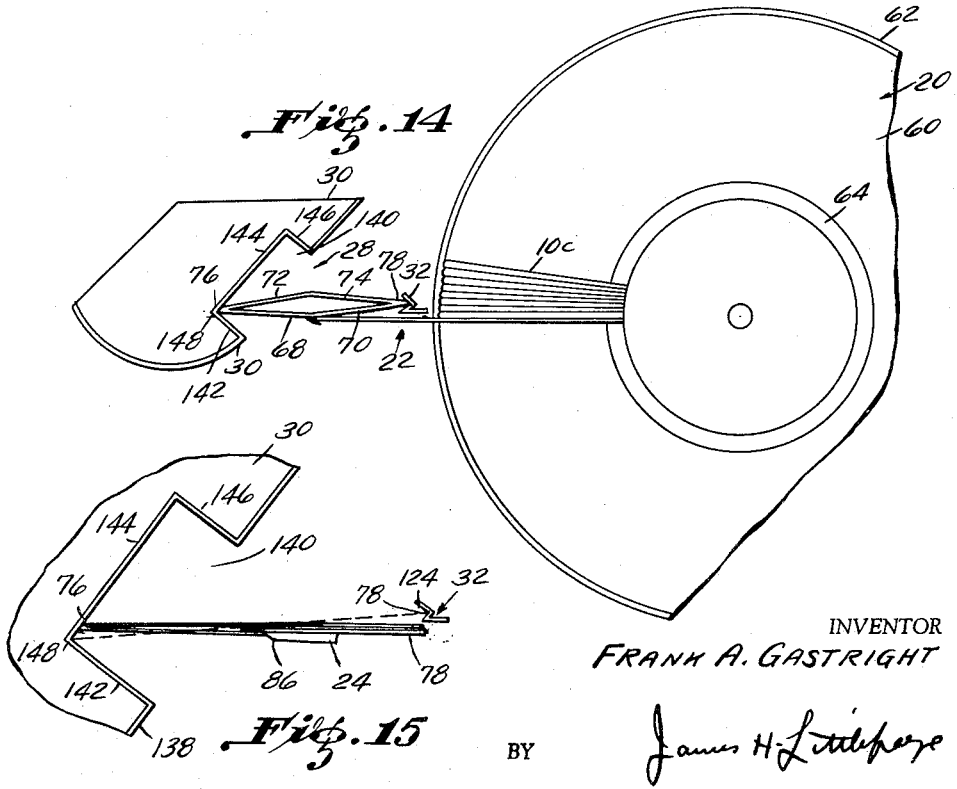
INVENTOR
FRANK A. GASTRIGHT
BY
ATTORNEY

INVENTOR
FRANK A. GASTRIGHT

BY
ATTORNEY

March 13, 1962  F. A. GASTRIGHT  3,024,710
POPCORN PACKAGING AND DELIVERING
Filed July 16, 1956  9 Sheets-Sheet 9

LEGEND
FEED STROKE ↑
DWELL |
RETRACTION STROKE ↓
OUTWARD DWELL OF FORM ....
INWARD DWELL OF FORM ---

INVENTOR
FRANK A. GASTRIGHT
BY
ATTORNEY

United States Patent Office 3,024,710
Patented Mar. 13, 1962

3,024,710
POPCORN PACKAGING AND DELIVERING
Frank A. Gastright, Fort Lauderdale, Fla., assignor to Vend-A-Box, Inc., Cincinnati, Ohio, a corporation of Ohio
Filed July 16, 1956, Ser. No. 598,096
7 Claims. (Cl. 93—53)

This invention relates to vending machines and, more particularly, to a machine for dispensing popcorn and the like bulk commodities in a box which is erected, filled and delivered at the point of sale.

The primary object of the invention is to provide a machine for deriving a collapsed box from a magazine, moving the collapsed box to an erecting and filling station, erecting the box in a form at the filling station so that it will be precisely formed and positioned for filling, then filling the box with a measured charge of a bulk commodity, hereinafter defined as "popcorn," dispensed from a hopper, and finally delivering the filled box to a location for receipt by the customer.

Another object of the invention is to provide a popcorn vending machine utilizing comparatively little floor space, even though its popcorn and box-blank capacity be large. To accomplish this, it is now proposed that the popcorn be stored in a bin in the top of the machine and dispensed by gravity through a hopper at the bin bottom and thence through a metering device, and a collapsed box magazine in the lower portion of the machine, the collapsed boxes being successively moved upwardly to an erecting and filling station at an intermediate portion of the machine situated at a level which is convenient for the customer to pick up the filled box. Thus, most of the interior of the machine casing is utilized to best advantage.

Still another object of the invention is to provide a collapsed box erecting and positioning mechanism whereby exterior tabs on a self-erecting collapsed box are engaged by lugs on a feeder blade so that the collapsed box is wiped off the end of a row of collapsed boxes in a magazine. In order to maintain a positive control relationship between the collapsed boxes in the magazine and the feeder blade, it is intended that the blade, which sweeps across the collapsed box row end, shall have such an effective width that it always constitutes a barrier for the end of the row of collapsed boxes which are urged against the blade. A collapsed box particularly suited for utilization in the subject machine is disclosed in my copending application entitled Self-Erecting Box With Tabs and Recesses for Engagement by Feeding and Erecting Mechanism, filed concurrently herewith.

Yet another object is to provide an erecting form into which a self-erecting collapsed box is shoved, which form will not only assure that the box will be precisely shaped and positioned for filling, but which also will thereafter move the erected and filled box from the filling station to a delivery station at the exterior of the machine. When the machine is not operated, the erecting form dwells across the output opening of the machine and constitutes a barrier, and by this means, the inner works of the machine are protected from the meddling hands of the customers, and vice versa.

These and other objects will be apparent from the following specification and drawings, in which:

FIG. 2 is an elevation of the left-hand side of the machine, partly broken away;

FIG. 3 is an elevation of the right-hand side of the machine;

FIG. 6 is a plan view of the collapsed box magazine;

FIG. 7 is a front elevation of the collapsed box magazine;

FIG. 8 is an exploded view showing, in perspective, the components of the collapsed box feeding mechanism;

FIG. 11 is a front elevation showing the collapsed box magazine, feeding and erecting mechanism, and erecting and delivery form at the completion of an operating cycle;

FIG. 12 is a diagrammatic plan view of the parts as shown in FIG. 11;

FIG. 13 is a front elevation of the parts shown in FIG. 11, wherein the feeder blade has fed a collapsed box to the erecting and delivery form, wherein the opening pusher is about to start its forward motion, and the feeder blade is ready to return to its FIG. 11 position;

FIG. 14, is a diagrammatic plan view of the parts as shown in FIG. 13;

FIG. 15 is an enlarged diagrammatic view illustrating the kick-over action when the collapsed box is fed into the erecting form;

Figure 1:
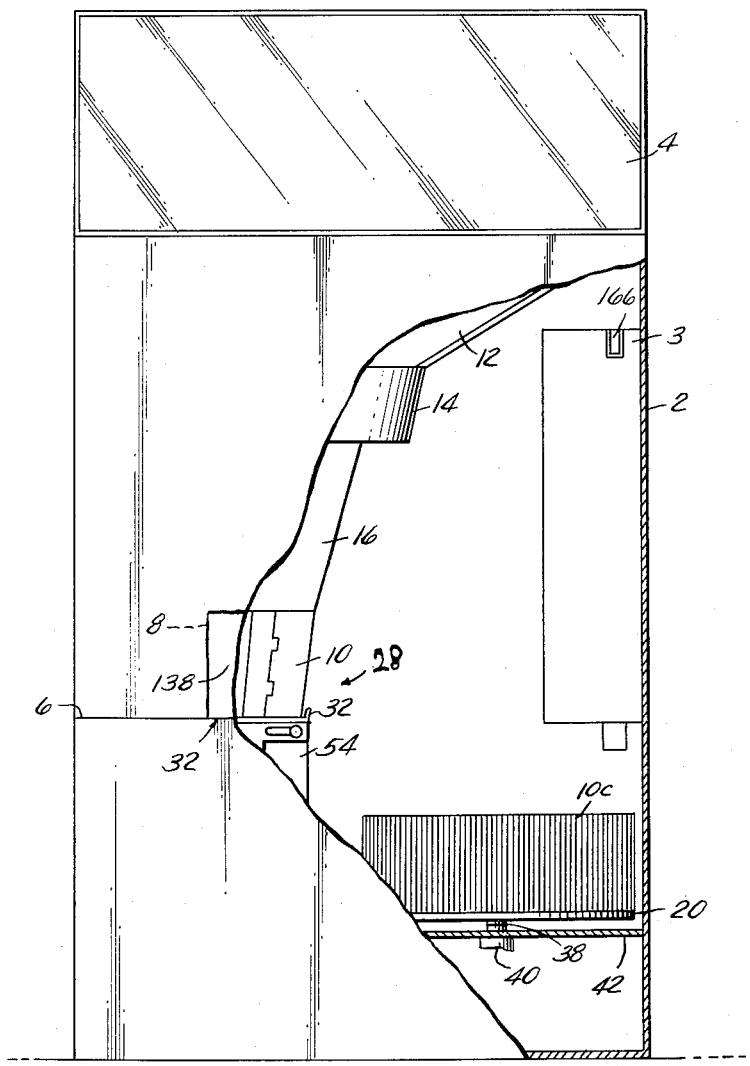
FIG. 1 is a front elevation of the machine, partly broken away to show the interior.

Referring now to the drawings, in which like reference numerals denote similar elements, the over-all operation of the machine is as follows: In the upper portion of a cabinet 2 is a glass enclosed bin 4 into which popcorn is placed. After an operating cycle of the machine has been instituted, as by insertion of a coin in the coin-control mechanism 3, the popcorn is delivered through an output opening 8 onto a shelf 6 at the front of the machine in an open-top box 10. In so doing, the popcorn passes through the open hopper-bottom 12 of bin 4 into a rotary measuring device 14 which, for each increment thereof, dispenses one box of popcorn into a chute 16 where it falls into an open erected box 10 which, at the time the popcorn falls down the chute, is waiting to receive it.

In the lower portion of cabinet 2, the boxes 10, as yet in collapsed condition and so denoted 10C, are stored in a circular row in a rotary magazine 20, from which magazine the collapsed boxes are fed to an erecting and filling station denoted generally at 28. At the start of an operating cycle, form 30 swings inwardly from its normal outward dwell position, a collapsed box is wiped off the end of the row by a feeder blade 24 which engages under tabs 84 on the collapsed box and carries the latter to the erecting and filling station 28 beneath the lower end of chute 16. Each box 10 is of the self-erecting type with interlocking bottom flaps arranged so that when it, in collapsed condition, is shoved into form 30, the box walls assume tubular configuration. Feeder blade retracts from the erecting station while a pusher 34 moves forwardly to erect the box in form 30 and hold the erected box firmly while it is being filled. The measuring device 14 then rotates so as to dump the popcorn through chute 16 into the waiting box 10, pusher 34 retracts, and form 30 rotates so as to deliver the filled box through output opening 8 to the delivery station 32 on shelf 6.

The collapsed box magazine 20 shown filled with collapsed boxes 10C in FIG. 1 and with lesser numbers in FIGS. 6, 7, and FIGS. 11–17 comprises a circular tray 36 rotatably supported by bearings 38, 40 on a plate 42 affixed in the lower portion of cabinet 2. Tray 36 is biased to rotate counter-clockwise, as seen in top plan view, by a torsion spring drive 44 affixed on plate 42 and connected near the lower end of a shaft 46 extending downwardly from tray 36. An abutment plate 48 affixed on tray 36 serves to urge the collapsed boxes 10C stacked in a circular row on the tray towards a back-up plate 50 shown in FIGS. 6 and 7. In subsequent figures, back-up plate 50 is removed to simplify the illustration of other elements. Back-up plate 50 is supported on an arm 52 affixed on the chassis plate 54 and serves to reenforce feeder blade 24 against the push exerted thereon by collapsed boxes 10C which are urged against it by torsion spring drive 44. A switch 56 on the free end of arm 50 is engaged by a finger 58 on abutment plate 48 when the supply of collapsed boxes is depleted, thereby, through conventional circuitry (not shown) disabling the machine from further operation until magazine 20 has been recharged with collapsed boxes.

It should be noted that the upper surface of tray 36 is formed with an annular channel 60 bounded at its outer periphery by an upstanding lip 62 and at its inner periphery by an inclined shoulder 64. On each collapsed box 10C is a notch 66 formed in the corner which must be disposed at the inner periphery of channel 60 to orient the box properly for feeding. The lower edges of the collapsed boxes will not fit in channel 60 and rest flatwise on the channel bottom unless the boxes are properly oriented. Boxes 10 are detailed in the copending patent application referred to hereinbefore, the significant features being that the pairs of sides 68, 70 and 72, 74 lie substantially flat and respectively coplanar in the collapsed condition of the box, and the box is erected by placing the leading edge 76 against an abutment, i.e., form 30, and then forcing the trailing edge 78 towards the form so that the box sides spread, and bottom flaps 80 interlock. Integral with box side 68 and extending beyond the fold line 82, which becomes one of the corners of the erected box, are a pair of tabs 84 which freely overlap the adjacent box side 70. Fingers 86 on feed blade 24 engage beneath tabs 84.

Referring particularly to FIG. 8, and FIGS. 11 to 17, inclusive, the box feeder assembly is supported on a fixed chassis plate 54 having therethrough an opening 88 to accommodate a drive shaft 90 which, during one complete cycle of machine operation, rotates clockwise 360 degrees, starting at the one-o'clock position as shown in FIG. 11. Crank arm 92 affixed on the end of drive shaft 90 carries at its free end a roller 94 which slides in the curved slot 96 on a lever 98 rockably supported by a pivot 100 affixed on chassis plate 54. The free end of lever 98 is affixed to feeder blade 24 and, when crank arm 92 is in its one-o'clock position, fingers 86 on feeder blade 24 lie just below the lower edges of the tabs 84 on collapsed boxes 10C in magazine 20. When crank arm 92 rotates approximately 120 degrees clockwise from its starting position, feeder blade 24 is rocked counterclockwise about its pivot 100 to perform a feed stroke, from the position shown in FIG. 11 to that of FIG. 13 and, upon continued clockwise rotation of the crank arm, for the remainder of the circle, the feeder blade retracts to its starting position. It should be noted that feeder blade 24 has a heel 25 formed so that when the other portion of the feeder blade are away from the end of the collapsed box row in magazine 20, heel 25 is disposed so as to block the endmost collapsed box from being pushed beyond the plane of the feeder blade.

Figure 16:
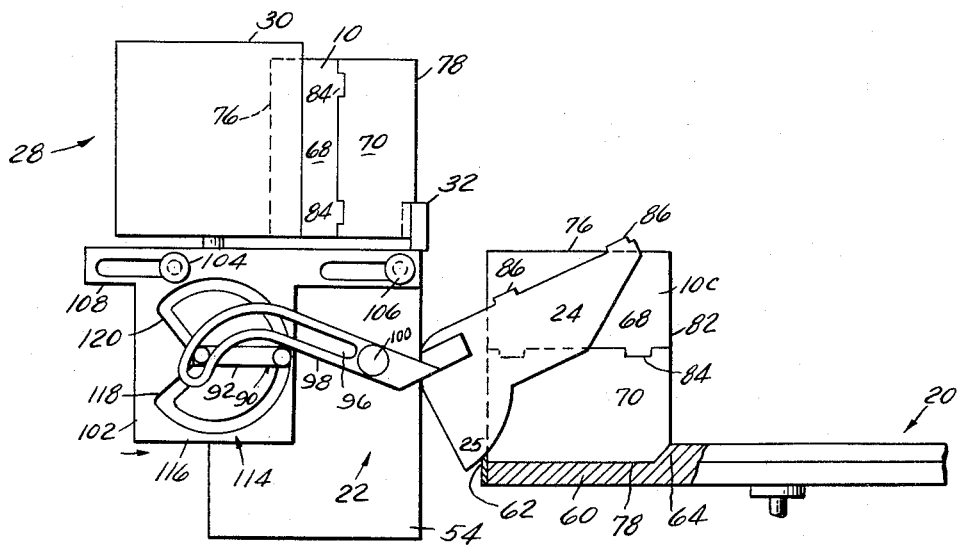
FIG. 16 is a front elevation of the parts shown in FIG. 11, wherein the opening pusher has completed its forward motion and is ready to retract, and the feeder blade has partly returned to its FIG. 11 position.
Figure 17:
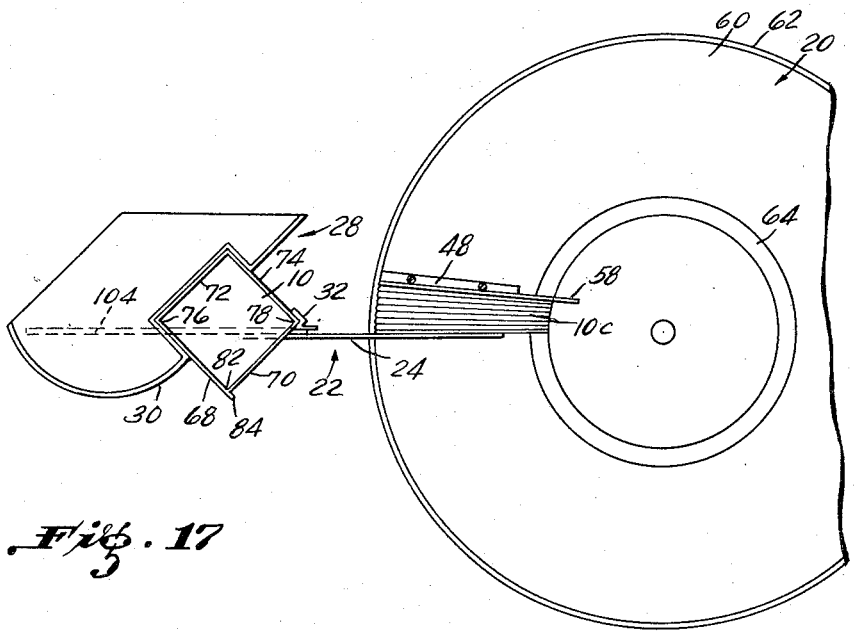
FIG. 17 is a diagrammatic plan view of the parts as shown in FIG. 16.

A cam plate 102 is slidably supported on pins 104, 106 extending outwardly on chassis plate 54 which slidably engage in elongate slots 108, 110 in the cam plate so that the latter is free to slide between the retracted position shown in FIGS. 11 to 15, inclusive, and the forward position shown in FIGS. 16 and 17, and a slot through cam plate permits the latter to slide over drive shaft 90. The forward and retracting motion of cam plate 104 are attained by means of a cam groove 114 in its outer face, the cam groove having an arcuate portion 116 and radial channels 118, 120. A pin 122 (FIG. 8) extending inwardly from near the free end of crank arm 92 rides in cam groove 114 and, for approximately the first 200 degrees of rotation, pin 122 moves in the arcuate portion 116 of the groove and does not drive cam plate 102. However, when pin 122 reaches the end of arcuate portion 116 and enters radial channel 118, cam plate 102 is stroked forwardly from the retracted dwell position of FIGS. 11–15 inclusive to its forward dwell position of FIGS. 16 and 17, and when pin 122 slides in radial channel 120, cam plate 102 is returned to its retracted dwell position. Pusher 32 is affixed on and moves with cam plate 102.

Pusher 32 (FIG. 8) is V-shaped with a long arm 124 on the far side, and short arm 126 disposed on the side closely traversed by feeder blade 24 during its feed and retracting strokes. Short arm 126 has an inturned toe 128 for deflecting feeder blade 24 away during the latter's retraction stroke, thus positively preventing bang-up of the feeder blade in the pusher.

Erecting form 30 consists of a flat base 130 affixed on the upper end of a vertical slope 132, the latter being rotatably supported on a fixed chassis part 134 by a bearing 136. Form 30 has a curved vertical wall 138, extending upwardly from flat base 130, and a rectalateral recess 140 defined by flat vertical walls 142, 144, 146 (FIG. 15). When form 30 lies in its inner dwell position, whereat it cooperates to open a collapsed box 10C, corner 148 is slightly offset from the feeding plane of feeder blade 24 so that the leading edge 76 of collapsed box 10C first engages flat wall 144 of the form slightly away from corner 148. Pusher 32 is also offset slightly from the path of collapsed box 10C during the box feed stroke. However, when leading edge 76 strikes flat wall 144, it is cammed thereby into corner 148, collapsed box 10C pivots slightly on feeder blade 24, and the trailing edge 78 of the collapsed box is thereby kicked over in front of pusher 32, as indicated by dotted lines in FIG. 15. Pusher 32 then moves forwardly towards form 30 to erect box 10, while feeder blade 24 retracts clear of the erecting box.

Figure 10:
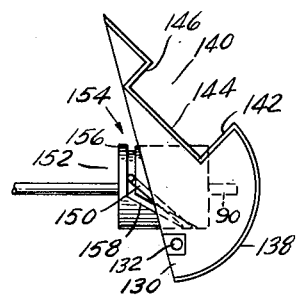
FIG. 10 is a diagrammatic plan view showing the erecting and delivery form.

Vertical shaft 132 which supports form 30 has affixed on its lower end an arm 150 (FIGS. 9 and 10) from the free end of which depends a follower pin 152 riding in slot 154 of a box cam 156 affixed on drive shaft 90. Slot 154 is primarily annular, as indicated at 156, but provided for part of its length with a V-shaped throw portion 158. So long as follower pin 152 rides in the annular slot portion 156, form 30 dwells inwardly, as in FIGS. 13 to 17, inclusive, and when box cam 156 rotates so that follower pin 152 is thrown to the end of the V-shaped portion 158 of slot 154, shaft 132 rotates so as to swing form 30 to its outward position of FIG. 11 where it dwells between cycles of operation of the machine.

Figure 9:
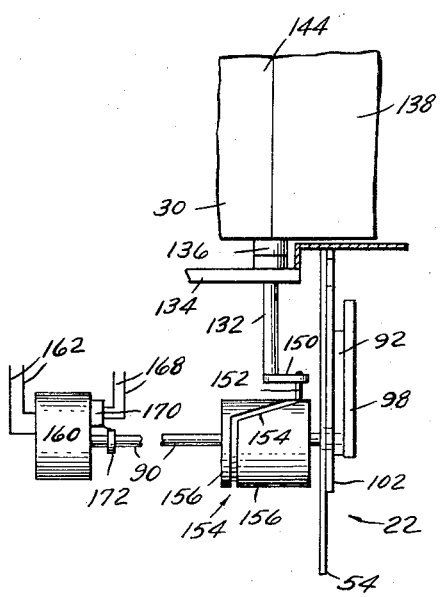
FIG. 9 is a side elevation showing the erecting and delivery form and part of the drive therefor.

Electric drive motor 160, indicated by block diagram in FIG. 9, is energized by connections 162 leading from control panel 164 associated with coin control mechanism so that, when a coin is inserted in coin slot 166, drive motor 160 is energized to start the operating cycle. A control circuit 168, under control of a switch 170 actuated by the lobes of a cam 172 on drive shaft 90, also leads to control panel 164 which contains suitable conventional relay circuits for accomplishing the operating cycle diagrammed in FIG. 18.

Figure 4:
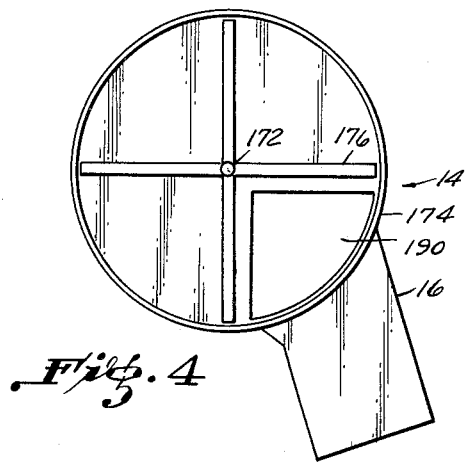
FIG. 4 is a plan view of the measuring device and chute.
Figure 5:
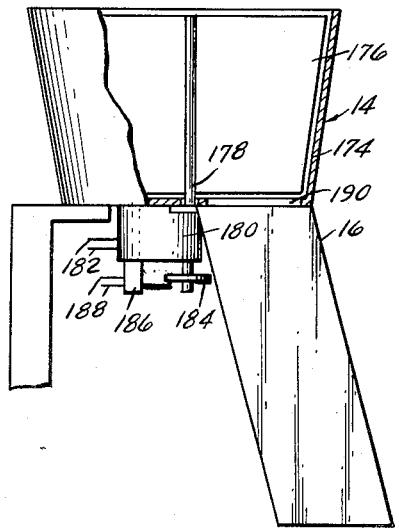
FIG. 5 is a side elevation showing the measuring device, chute and valve.

Referring particularly to FIGS. 4 and 5, measuring device 14 is conventional and comprises an open top receptacle 174 disposed below hopper 12, and a four-vane rotor 176 mounted on a vertical shaft 178 driven by a slow-turning motor 180 energized from control panel 167 by circuit 182. A cam 184 on vertical shaft 178 has lobes which actuate a switch 186 connected by a control circuit 188 to control panel 164, and also participates in the execution of the cycle diagrammed in FIG. 18. During each cycle of operation, rotor 176 turns 90 degrees so as to drop a box measure of popcorn through opening 190 and chute 16 to a waiting box 10.

Figure 18:
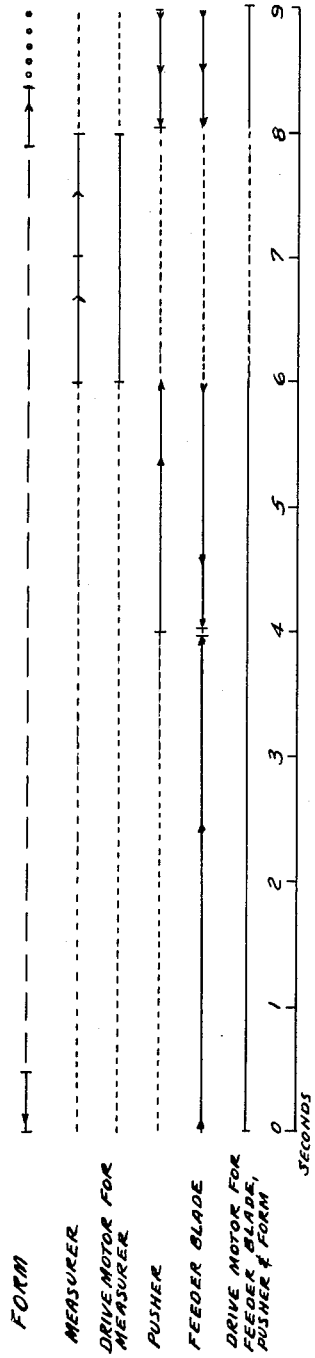
FIG. 18 is a time diagram illustrating the relative motions of the parts.

Referring to FIG. 18, the operating cycle diagrammed therein is as follows: When a suitable coin is dropped in slot 166 of coin control mechanism 3, circuit 162 to motor 160 is energized, feeder blade 24 swings upwardly from its FIG. 11 position, wipes off a box 10C from the end of the collapsed box row, and transports the collapsed box to erecting form 30. Meanwhile, as soon as drive shaft 30 starts to rotate, erecting form 30, which at the start of the cycle was outwardly disposed in its FIG. 12 position, moves inwardly to its FIG. 14 position in readiness to receive the leading edge 76 of collapsed box 10C. Feeder blade 24 then shoves the collapsed box 10C into form 30 sufficiently to cause the opposite flat sides of the collapsed box to spread apart, thereby causing tabs 84 to swing away from the overlapped box side 70 sufficiently to free blade fingers 86 from beneath tabs 84, and to cause the trailing edge 78 of the collapsed box to kick over in front of pusher 32. Pusher 32 then starts forwardly and feeder blade 24 then starts its retracting stroke.

As soon as pusher 32 reaches its foremost position, box 10 is completely open and cam 172 actuates switch 170, and the relays on control panel 164 de-energize circuit 162 for motor 160 and energize circuit 182 for motor 180. As a result, drive shaft 90 and the box-opening elements associated therewith stop, and shaft 178 rotates 90 degrees so as to dispense a box measure of popcorn into waiting box 10 at the lower end of chute 16, whereupon cam 184 actuates switch 186 so that the relays in control panel 164 open the circuit 182 for motor 180 and re-close circuit 162 for motor 162. Pusher 32 then retracts, feeder blade 24 resumes its retracture stroke and, slightly before the cycle is completed, box 156 rotates sufficiently so that follower pin 152 is thrown by one of the branches of V-slot 158 so as to swing form out through output opening 8 to its FIG. 12 position, and one of the lobes on cam 172 again actuates switch 170 and the relays in control panel 164 open both motor circuits 162 and 182 to stop the machine and complete the cycle.

The machine is adaptable for vending various commodities other than popcorn, and may be actuated by mechanism other than coin-control. The invention is not limited to the details of the structure disclosed and described hereinbefore, but is intended to cover all substitutions, modifications and equivalents within the scope of the following claims:

I claim:

1. Erecting mechanism for tubular boxes of the deformable parallelogram type which include four side panels joined by two pairs of diagonally opposed corner folds, wherein each of said boxes is initially collapsed to form a flat two-layer sheet with one opposed pair of corner folds constituting the side edges, said mechanism comprising a magazine for storing said collapsed boxes, an erecting form spaced from said magazine, a feeder blade having means on a forward portion thereof for engaging a flat side of a collapsed box, means mounting said feeder blade for oscillating movement along a feed path wherein said feeder blade engages the side of a collapsed box in said magazine and moves the same along the feed path into said form and returns towards said magazine the side edges of said collapsed box respectively having leading and trailing relationship with respect to said feed motion, said erecting form being disposed across said path adjacent the end thereof, a pusher normally dwelling laterally adjacent one side of said path between said magazine and said form, means for moving the trailing edge of the collapsed box laterally from said feed path to a point directly between said pusher and said form, and means for moving said pusher towards said form whereby to push the collapsed box edgewise into the form, thereby spreading the side panels to tubular configuration, said feeder blade having surface means on a rear portion thereof for sweeping across the end of the row of collapsed boxes in said magazine whereby to constitute an abutment for the row end during the feed stroke of the blade.

2. Erecting mechanism for tubular boxes of the deformable parallelogram type which include four side panels joined by two pairs of diagonally opposed corner folds, each of said boxes being in initially collapsed condition wherein the sides form a substantially flat two-layer sheet with one opposed pair of corner folds constituting substantially the side edges, said mechanism comprising a magazine for storing said collapsed boxes, an erecting form spaced from said magazine, feeder means for engaging and holding thereon the side of a collapsed box in said magazine intermediate the side edges of the box, means mounting said feeder means for feed stroke motion along a feed path extending from said magazine to adjacent said form, the opposite side edges of said collapsed box respectively having leading and trailing relationship wiht respect to the feed motion thereof, said erecting form having a concave corner facing the end of said path, a pusher, means mounting said pusher laterally adjacent said feed path for reciprocating movement along a linear path towards and away from said form, said pusher having substantially V-shaped box-edge engaging surfaces thereon with the open side of the V disposed towards the form for seating over the trailing edge of the box, drive means for actuating said feeder means so as to feed the collapsed box from the magazine to the form, a flat side of the fed collapsed box sweeping past the pusher during the feed motion thereof, means for deflecting the trailing edge of the fed collapsed box laterally from the feed path thereof into the linear path of the pusher, and means for moving said pusher along said linear path, whereby to push the collapsed box edgewise into the form corner, thereby spreading the side panels to tubular configuration.

3. The combination claimed in claim 2, said feeder means comprising a blade having fingers thereon for engaging pockets on the flat sides of said collapsed boxes.

4. In a collapsed box feeding and erecting mechanism, a magazine comprising a circular tray, a support, a central bearing rotatably mounting said tray on said support, spring means engaged between said tray and said support for biasing said tray to rotate in one direction, a substantially annular channel on said tray for receiving an arcuate row of collapsed boxes stacked edgewise therein, an abutment affixed on said tray and extending transversely of said channel for urging said boxes to rotate with the tray, a fixed abutment mounted on said support and extending across said channel, a feeder blade, means mounting said feeder blade on said support for sweeping motion across said channel adjacent said abutment, means on the feeder blade for engaging the sides of said collapsed boxes, means for driving said feeder blade through a feed stroke of predetermined length, the length of the feeder blade being at least as long, as measured in the direction of feed stroke movement, as the length of the feed stroke whereby said feeder blade engages between said abutment and the row end of collapsed boxes and constitutes a slidable abutment for the row end of collapsed boxes at all times, said channel being non-symmetrical in transverse cross-section for cooperating with complementary non-symmetrical configuration of the bottom edges of said stacked boxes, whereby to orient the disposition of said boxes in said channel.

5. Erecting mechanism for tubular boxes of the deformable parallelogram type which include four side panels joined by two pairs of diagonally opposed corner folds, each of said boxes being in initially collapsed condition wherein the sides form a substantially flat two-layer sheet with one opposed pair of corner folds constituting opposite side edges, said mechanism comprising: a magazine for storing said collapsed boxes, a form spaced from said magazine, feeder means for engaging a collapsed box in said magazine, means mounting said feeder means for feed stroke motion along a feed path extending from said magazine to adjacent said form, the opposite side edges of said collapsed box having leading and trailing relationship with respect to the feed motion thereof, a pusher, means mounting said pusher laterally adjacent said feed path for reciprocating movement along a path towards and away from said form, drive means for actuating said feeder means so as to feed the collapsed box from said magazine to the form, a flat side of the fed collapsed box sweeping past the pusher during the feed motion thereof, means for deflecting the trailing edge of the fed collapsed box laterally from the feed path into the path of the pusher, and means for actuating said pusher whereby to push said box edgewise into the form, thereby spreading the side panels to tubular configuration.

6. Erecting mechanism for tubular boxes of the deformable parallelogram type which include four side panels joined by two pairs of diagonally opposed corner folds, each of said boxes being in initially collapsed condition wherein the sides form a substantially flat two-layer sheet with one opposed pair of corner folds constituting opposite side edges, there being notches in one side of each collapsed box between said side edges, said mechanism comprising: a magazine for storing a row of said collapsed boxes, a feeder blade for engaging against the side of a collapsed box at an end of the row in said magazine, an erecting form spaced from said magazine, said feeder blade having fingers thereon for engaging in said notches, means mounting said feeder blade for feed stroke motion along a feed path laying in a vertical plane extending from said magazine and transversely across the end of the row of collapsed boxes to adjacent said form, the opposite side edge of said collapsed box having leading and trailing relationship with respect to the feed motion thereof, a pusher, means mounting said pusher laterally adjacent said feed path for reciprocating movement towards and away from said form along a path lying in a vertical plane adjacent and substantially parallel to the plane of the path of the feeder blade, drive means for actuating said feeder blade so as to sweep the feeder blade along the side of a collapsed box in the magazine, engage the fingers in the notches, and feed the collapsed box from said magazine into the form, the flat side of the fed collapsed box opposite the side with notches sweeping past the pusher during the feed motion thereof, means for engaging the trailing edge of the fed box in front of the pusher, and means for actuating said pusher whereby to push said box edgewise into the form, thereby spreading the side panels to tubular configuration.

7. Erecting mechanism for tubular boxes of the deformable parallelogram type which include four side panels joined by two pairs of diagonally opposed corner folds, each of said boxes being in initially collapsed condition wherein the sides form a substantially flat two-layer sheet with one opposed pair of corner folds constituting opposite side edges, there being notches in one side of each collapsed box between said side edges, said mechanism comprising: a magazine for storing a row of said collapsed boxes, a feeder blade for engaging against the side of a collapsed box at an end of the row in said magazine, an erecting form spaced from said magazine, said feeder blade having fingers thereon for engaging in said notches, means mounting said feeder blade for feed stroke motion along a feed path laying in a vertical plane extending from said magazine and transversely across the end of the row of collapsed boxes to adjacent said form, the opposite side edge of said collapsed box having leading and trailing relationship with respect to the feed motion thereof, a pusher, means mounting said pusher laterally adjacent said feed path for reciprocating movement towards and away from said form along a path lying in a vertical plane adjacent and substantially parallel to the plane of the path of the feeder blade, drive means for actuating said feeder blade so as to sweep the feeder blade along the side of a collapsed box in the magazine, engage the fingers in the notches, and feed the collapsed box from said magazine into the form, the flat side of the fed collapsed box opposite the side with notches sweeping past the pusher during the feed motion thereof, said pusher having substantially V-shape box edge engaging surfaces thereon, the open side of the V facing the form, and means for actuating said pusher whereby to push said box edgewise into the form, thereby spreading the side panels to tubular configuration.

References Cited in the file of this patent
UNITED STATES PATENTS

| | | |
|---|---|---|
| 2,333,490 | Philippi | Nov. 2, 1943 |
| 2,619,882 | Rohdin | Dec. 2, 1952 |
| 2,628,542 | Ross | Feb. 17, 1953 |
| 2,651,898 | Kimball | Sept. 15, 1953 |
| 2,662,356 | Swafford | Dec. 15, 1953 |
| 2,687,070 | Gastright | Aug. 24, 1954 |
| 2,696,381 | Bateman | Dec. 7, 1954 |
| 2,746,363 | Anderson | May 22, 1956 |
| 2,780,148 | Pearson et al. | Feb. 5, 1957 |